Aug. 25, 1959 J. P. CARTER 2,900,933
SHOE MACHINES
Filed Jan. 13, 1956 10 Sheets-Sheet 1

Inventor
James P. Carter
By his Attorney

Inventor
James P. Carter
By his Attorney

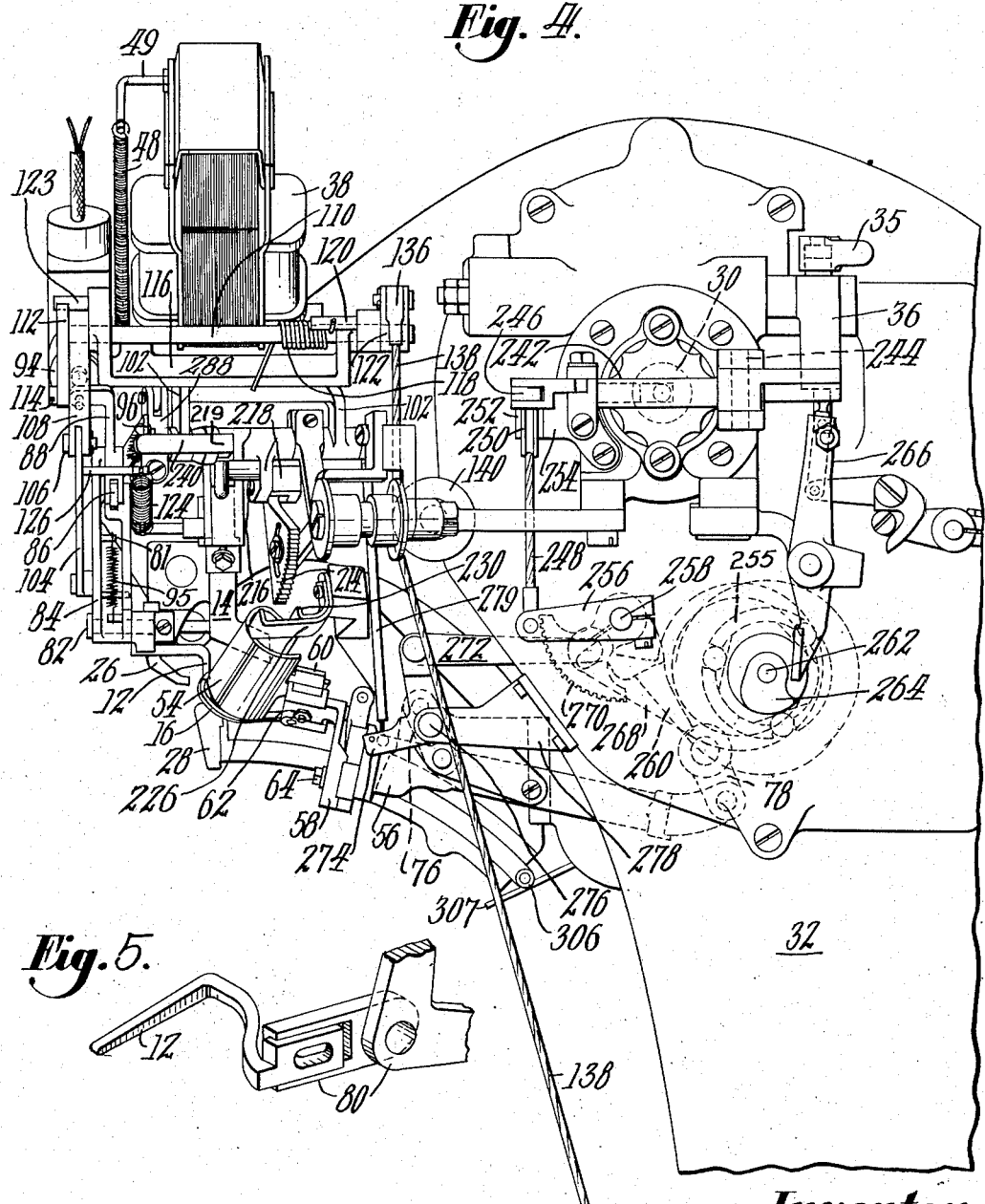

Aug. 25, 1959  J. P. CARTER  2,900,933
SHOE MACHINES
Filed Jan. 13, 1956  10 Sheets-Sheet 4

Inventor
James P. Carter
By his Attorney

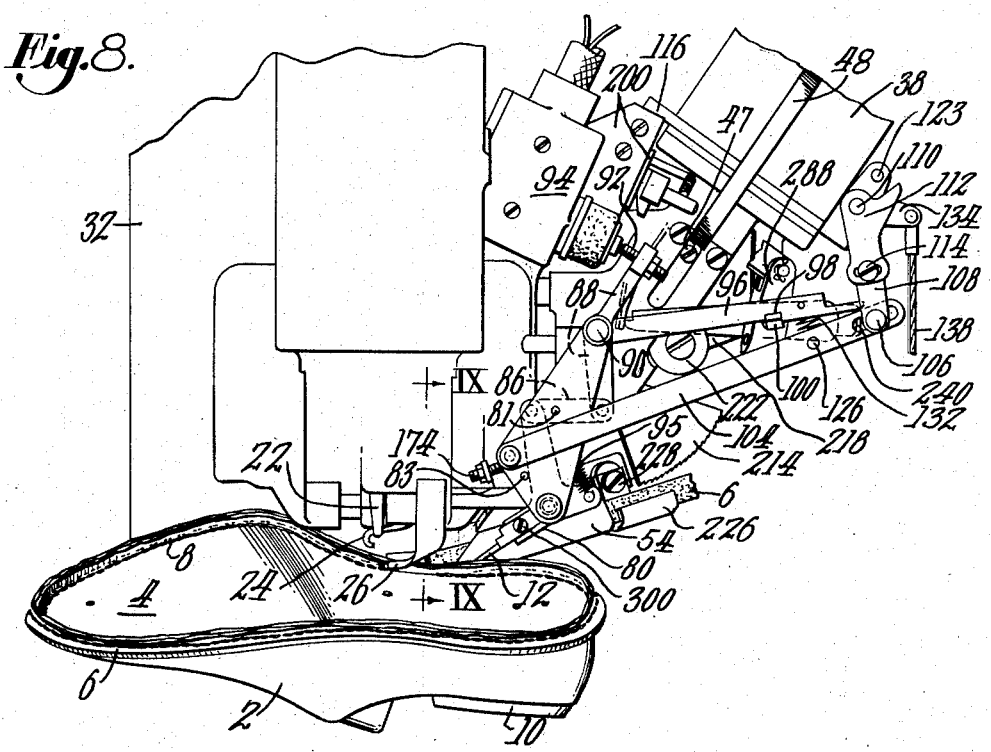

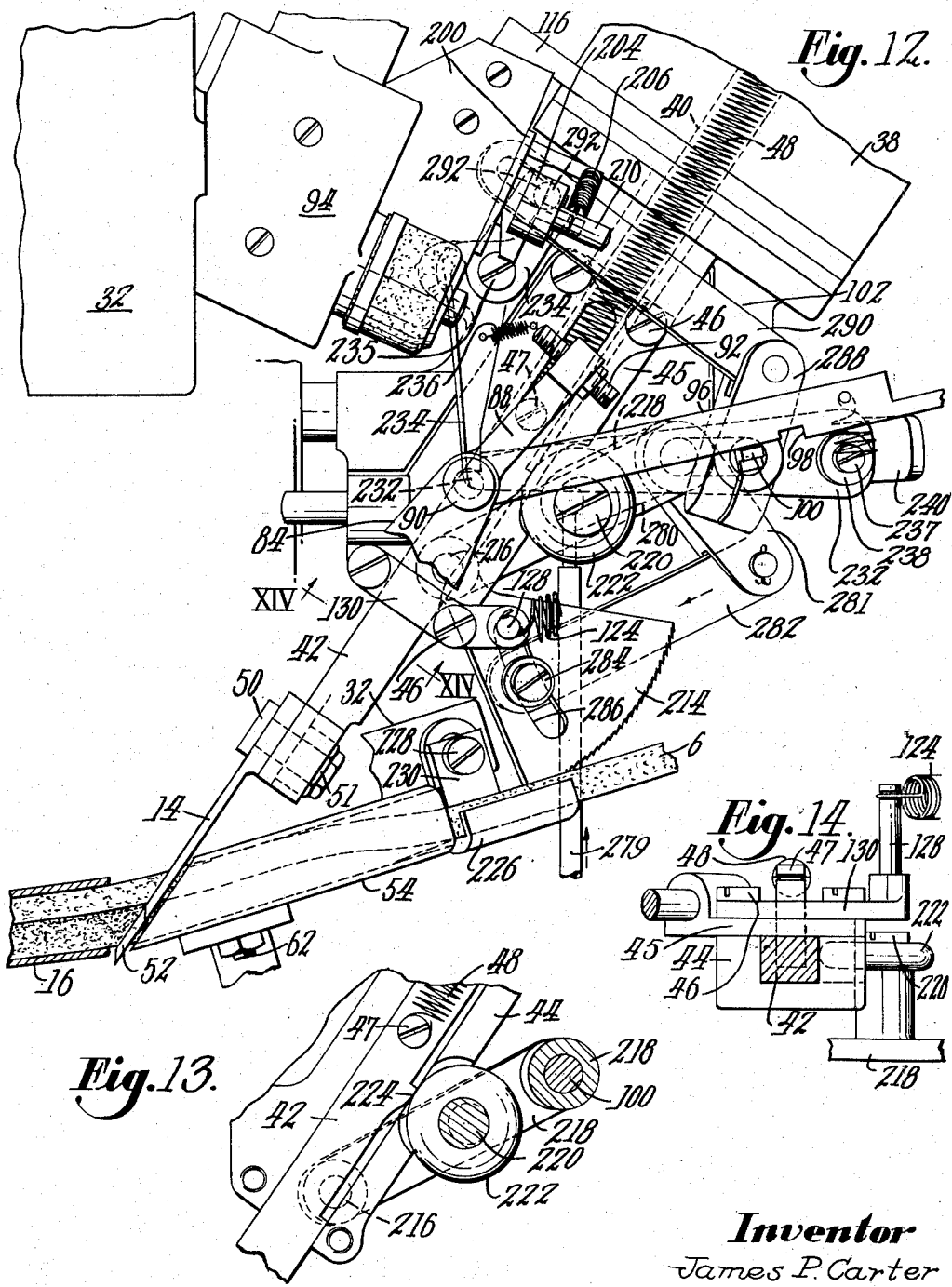

Inventor
James P. Carter
By his Attorney

Aug. 25, 1959  J. P. CARTER  2,900,933
SHOE MACHINES
Filed Jan. 13, 1956  10 Sheets-Sheet 8
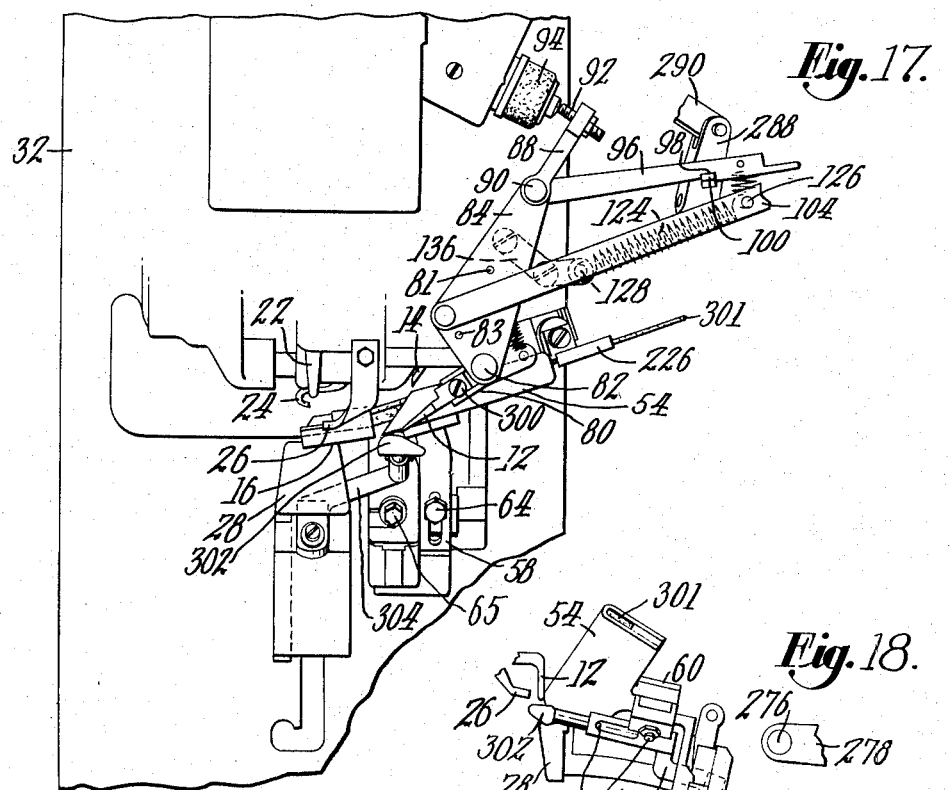
Fig. 17.
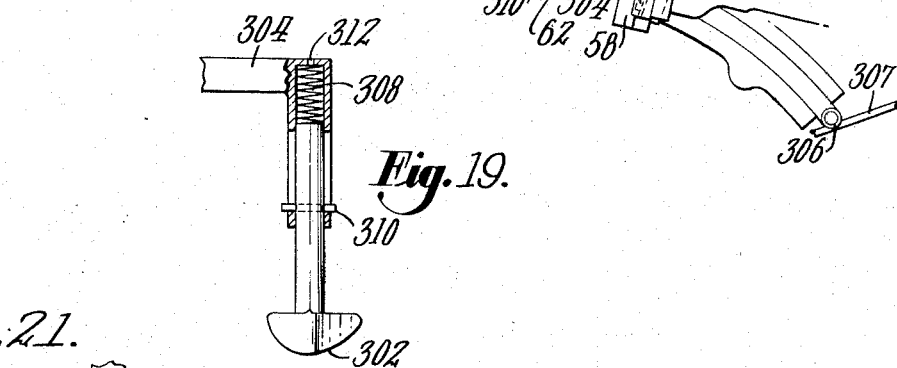
Fig. 18.
Fig. 19.
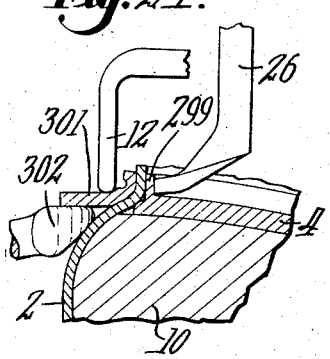
Fig. 21.
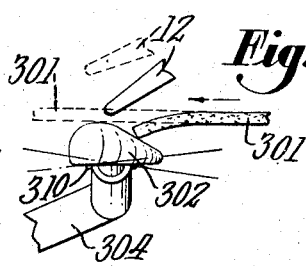
Fig. 20.
Inventor
James P. Carter
By his Attorney

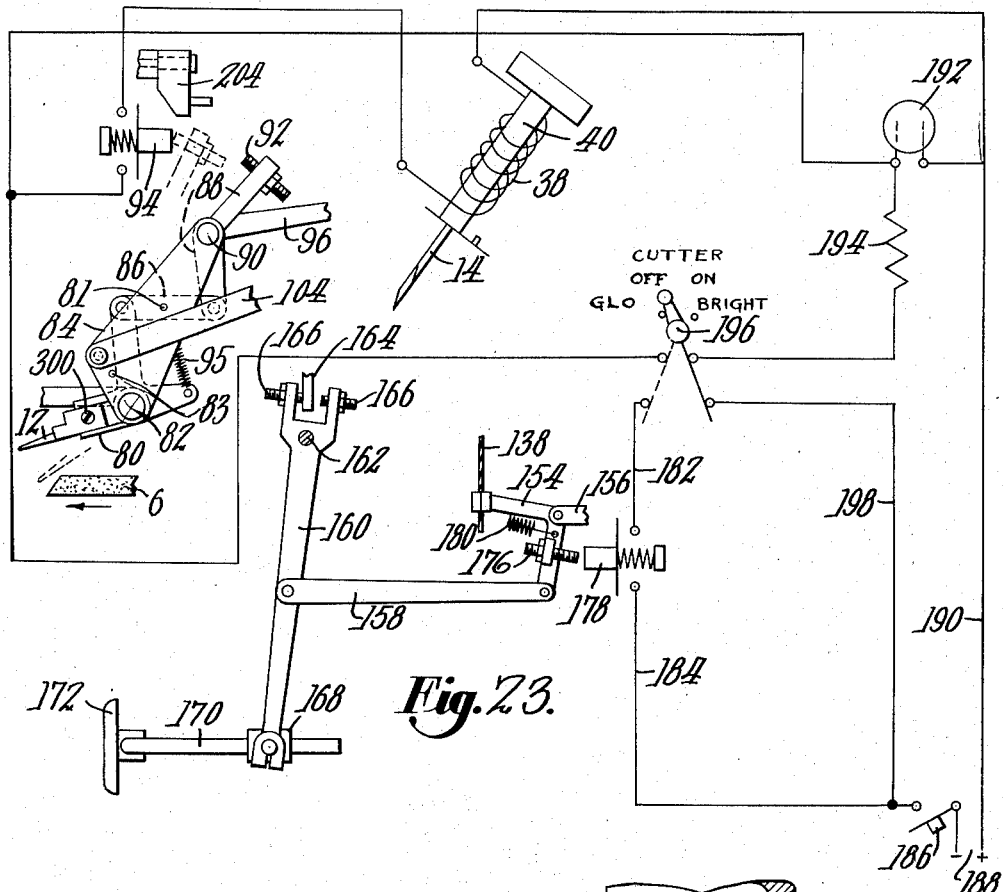
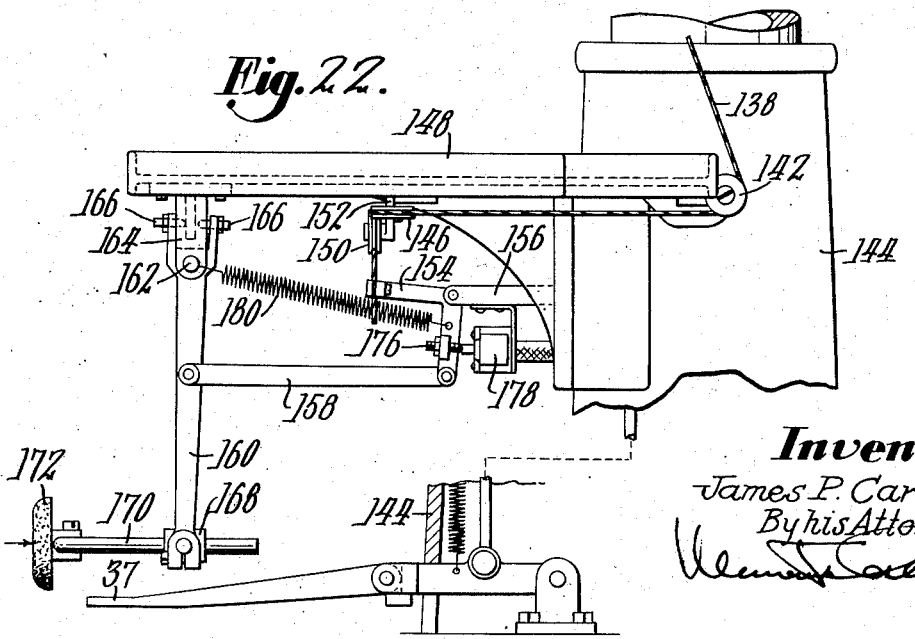

Aug. 25, 1959 J. P. CARTER 2,900,933
SHOE MACHINES
Filed Jan. 13, 1956 10 Sheets-Sheet 10

Inventor
James P. Carter
By his Attorney

United States Patent Office 2,900,933
Patented Aug. 25, 1959

2,900,933

SHOE MACHINES

James P. Carter, Beverly, Mass., assignor to United Shoe Machinery Corporation, Flemington, N.J., a corporation of New Jersey Application January 13, 1956, Serial No. 558,933

25 Claims. (Cl. 112—46)

The present invention relates to machines for attaching welts to lasted shoe uppers and sole members, and more particularly to devices in shoe inseam sewing machines for automatically severing accurately and quickly the welt being attached to the uppers and sole members in a manner which will cause a minimum of disturbance in the usual operating routine and which will offer greater uniformity and reliability of results with less tendency for excessive wear in the operating parts of such machines than is the case with prior machines of similar nature. In certain respects the invention embodies an improvement over a feeler controlled welt severing device for a shoe sewing machine disclosed in United States Letters Patent No. 1,774,498, granted September 2, 1930, upon application of Ashworth et al.

The machine of the Ashworth et al. patent above referred to is provided with a knife actuated automatically to sever a welt being attached to the outflanged upper and sole member of a stitchdown shoe. The machine of the patent operates satisfactorily when a flat-bottomed stitchdown shoe is being sewn, but because of irregularities in conformation of shoes of different styes, it is difficult to insure automatic actuation of a welt severing knife at the proper time in that machine for uniform and reliable results, the lack of uniformity and reliability ensuing from the use of a feeler for controlling a knife-actuating mechanism, which feeler bears upon the outflanged sole-supported portion of the upper.

The feeler in the prior machine is intended to be actuated only when it is engaged by the leading end of the welt first attached to the shoe as that welt end approaches the sewing point of the machine. Because the conformation of the sole and outflanged portion of the upper in a stitchdown shoe may display irregularities and the curvature of each shoe style or size requires varying pitching tipping and turning movements to be imparted to it, not bearing any fixed relationship for other shoe styles or sizes, such irregularities and varying movements, particularly along the shank portion of the shoe, may cause the knife controlling feeler of the patented machine to be actuated before being engaged by the leading end of the welt first attached to the shoe. Thus, an improperly formed joint frequently will result between the leading and final ends of the welt attached to such shoe.

An object of the present invention is to provide reliable mechanism for severing a welt automatically in any type of shoe sewing machine, and particularly in a Goodyear welt and inseam sewing machine for a so-called "sewed heel seat shoe," in which a relatively heavy welt is attached throughout the margin of a shoe bottom to form a continuous outsole attaching flange.

Other objects are to improve the construction and mode of operation of a Goodyear inseam sewing machine for attaching a welt to lasted uppers and insoles in a uniform and reliable manner with accurately formed joints between the ends of the welt for sewed seat work, and to provide such machine with a readily actuated alternative adjustment so that the same machine may operate satisfactorily on regular heel-breast to heel-breast work.

Still further objects are to improve the construction and mode of operation of welt severing devices for machines of the type referred to, in which clean bevel cut matching faces on the welt are formed at the ends in all cases, so that an accurate close-fitting and inconspicuous joint may be provided between the welt ends when brought into abutment.

In accordance with the purposes outlined above, an important feature of the present invention resides in a machine for attaching a welt to a last supported Goodyear welt shoe upper and sole member, the machine being equipped with the usual attaching, feeding and guiding devices, a severing knife also being provided to act on the welt at a point in advance of the attaching devices, in which machine the knife is actuated by mechanism controlled by a feeler mounted for movement during sewing operations toward and from a position of engagement with the leading end of welt on the shoe at a point backed by a bulging last supported portion of the shoe upper as the leading end approaches the attaching point. Such arrangement of the feeler is distinguished from prior feeler controlled devices of similar nature, in which the control feeler engages a less rigid part of the shoe and its operation is more susceptible to unavoidable variations in conformation and movements of the parts engaged. By employing a bulging last supported portion of the shoe upper to back the leading end of the welt the feeler is located where it will engage the leading end of the welt along that portion backed solidly by the bulging upper and the underlying last with particularly uniform and effective results.

These and other features, consisting of simplified and improved high-speed welt cutting knife actuating and welt advancing mechanisms, certain other devices, combinations and arrangements of parts, as hereinafter described and claimed, will clearly be understood from the following detailed description taken in connection with the accompanying drawings, in which:

Fig. 4 is a view in right side elevation showing some of the operating devices at the front part of the machine;

Fig. 5 is an enlarged detail view of a welt end feeler and a position of its mounting lever;

Fig. 8 is a view similar to Fig. 6 showing the position of the shoe as the seam inserted by the machine nears completion;

Fig. 9 is a detail view on an enlarged scale, indicating the manner of operation of the control feeler in the welt severing mechanism, looking from the line IX—IX of Fig. 8;

Fig. 10 is a perspective view of portions of a shoe surrounding the joint between matched ends of the welt after the inseam has been completed;

Fig. 11 is a plan view of the same portions of the shoe;

Fig. 12 is a detail view in front elevation and on an enlarged scale of a portion of a welt severing and advancing mechanism;

Fig. 13 is a further detail and sectional view of certain parts shown in Fig. 12 looking from the front of the machine;

Fig. 14 is a further detail and sectional view looking from the line XIV—XIV of Fig. 12;

Fig. 17 is a detail view in front elevation and on a reduced scale of a portion of the machine showing a welt supporting finger for insuring proper presentation of a particularly flexible thin welt to the control feeler;

Fig. 18 is a detail view in right side elevation of the welt supporting finger and a few of the surrounding parts in the machine;

Fig. 19 is a sectional plan detail view on a somewhat enlarged scale of the welt supporting finger;

Fig. 20 is a front elevation of the parts shown in Fig. 19;

Fig. 21 is a detail view of the welt supporting finger looking from the left side of the machine with a portion of a shoe being operated upon shown in section to indicate the relationship of the finger to the shoe;

Fig. 22 is a detail view of the lower portion of the machine looking from the right side and showing the control treadles;

Fig. 23 is a wiring diagram of the circuits controlling the welt severing mechanism;

Figure 1:
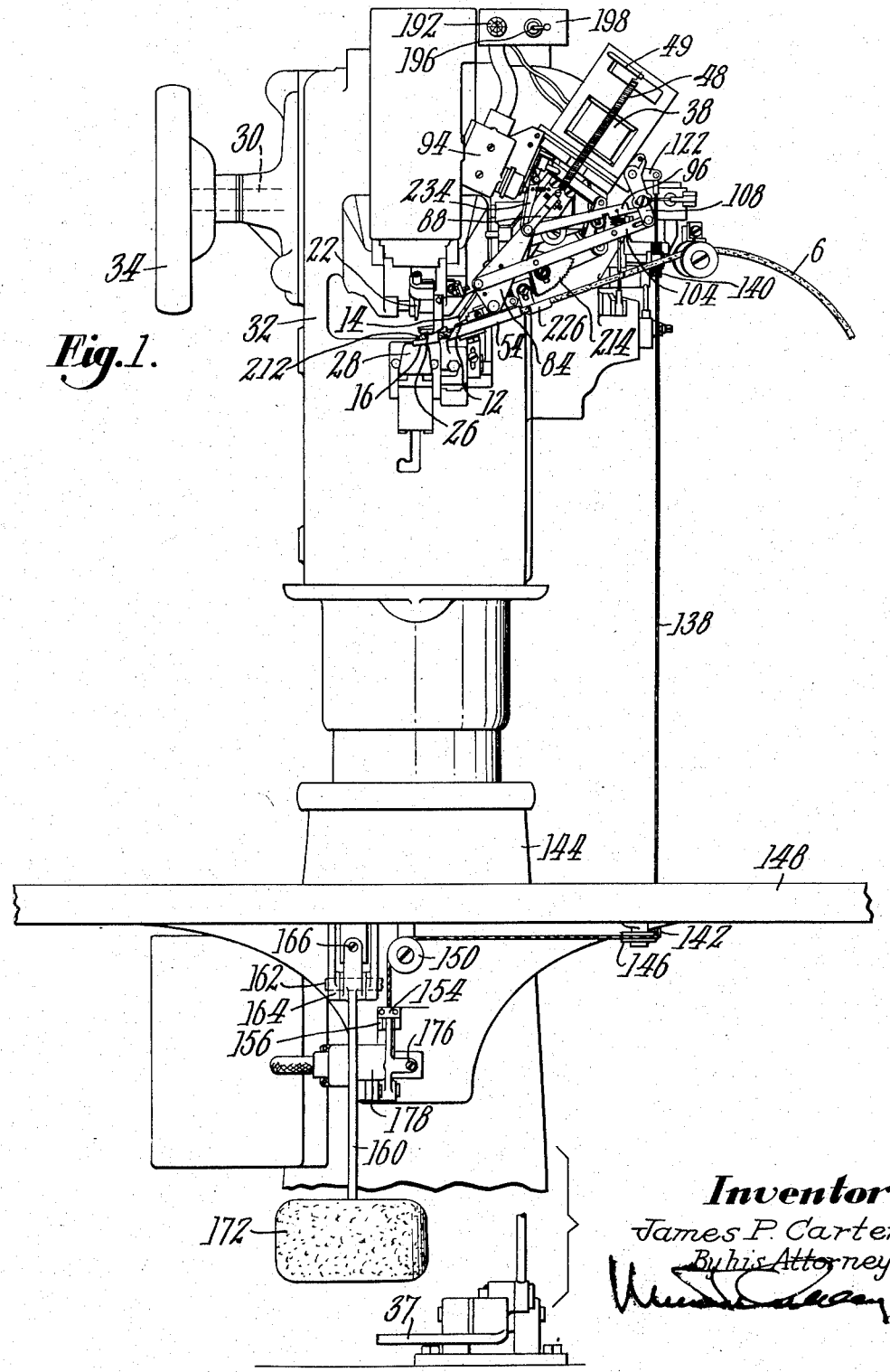
Fig. 1 is a view in front elevation partly broken away and contracted in height at the lower end of its supporting column, of a shoe inseam sewing machine embodying the features of the present invention.

The machine illustrated in the drawings is a shoe inseam sewing machine similar to that disclosed in United States Letters Patent No. 1,971,575, granted August 28, 1934, and No. 2,041,945, granted May 26, 1936, both on applications of Alfred R. Morrill. The machine of these patents is provided with welt severing and stitch-forming or other attaching devices, including a pair of retractable jaws and a power actuated knife acting against the welt while gripped by the jaws. The welt gripping jaws and knife are mounted in the machine for operation on the welt at the left side of the sewing point looking from the front of the machine, the work being fed from right to left, so that after severing the welt from a completely sewn shoe, the end of welt remaining in the machine will extend across the sewing point in the machine at a position where it will be engaged by the attaching devices in starting a seam of a new shoe.

It is customary to sew the inseam for attaching a welt to a last supported shoe upper and sole member, in the illustrated machine, either by starting and terminating the seam in line with the heel-breast at opposite sides of the shoe or by terminating it at the same point at which it is started on the same side of the shoe, the seam extending entirely around the heel seat of the shoe. When an inseam is started and terminated at the breast line of the heel, the welt gripping jaws and knife are actuated in the usual way at the end of each sewing operation. When a sewed heel seat shoe is operated upon, the welt gripping jaws and severing knife are not actuated in the usual way, certain hand operations including trimming the welt by a hand-held knife being required, with the result that extra time and effort on the part of the operator is expended and considerable welt is wasted.

To construct a sewed heel seat shoe in the prior machine, the shoe is first presented to the machine with a section along its inside shank as a starting point. The shoe is then sewed along the remainder of that side first presented and is turned to present the other side of the shoe to the attaching devices. As soon as the other side of the shoe is reached, the operator brings the machine to rest at a position with the sewing needle within the work so that the shoe will not be displaced while the machine is stopped. In order to bring the machine to rest without severing the welt the operator actuates a control treadle in such a way that the machine does not go through its usual stopping cycle and he also grasps a hand wheel on the sewing shaft firmly to prevent overthrow. Stopping the machine in this way requires more than usual physical exertion and is hazardous for other reasons. After the machine is stopped the end of the welt first attached to the shoe is trimmed by hand with a bevel cut close to the first stitch in the seam, so that the final end of the welt may later be trimmed in register with the first end of the welt with an inconspicuous joint. After hand trimming the leading end of the welt on the shoe the prior machine is restarted and the remainder of the shoe margin is sewn, the final end of the seam being continued until it overlaps the leading end. The machine is then stopped in the usual way with the stitch-forming devices disengaged from the shoe so that the shoe may be removed readily. Also, during the usual stopping operation the welt is severed by joint actuation of the gripping jaws and knife at the left side of the sewing point. After removal of the shoe from the machine, however, it still may be necessary in a second hand operation on the shoe to trim away the overlapping section at the final end of the welt so that a single thickness only will be left at the joint.

In order to avoid two hand trimming operations for each sewed heel seat shoe operated upon in the machine of the present invention, the machine is provided with welt-severing and end-advancing and positioning devices mounted for operation at a point spaced from the welt attaching devices and controlled by a yielding feeler which engages the end of the welt first attached to a shoe. With the illustrated machine no more than nominal attention is required on the part of the operator to complete the attaching operations on a sewed heel-seat shoe with a single continuous inseam and without any special hand trimming operations or welt wastage. Also, the machine is provided with a simple, readily manipulated adjustment for adapting it for use in forming a conventional welt attaching inseam extending from heel seat breast line to heel seat breast line only. To accomplish a sewed heel seat operation with reliability and uniformity the feeler of the illustrated machine is mounted for movement toward and from a bulging last supported portion of the shoe upper, thus providing a firm backing for the leading end of the welt first sewn to the shoe, at a point on which end the feeler engages it for actuation away from the upper.

Figure 6:
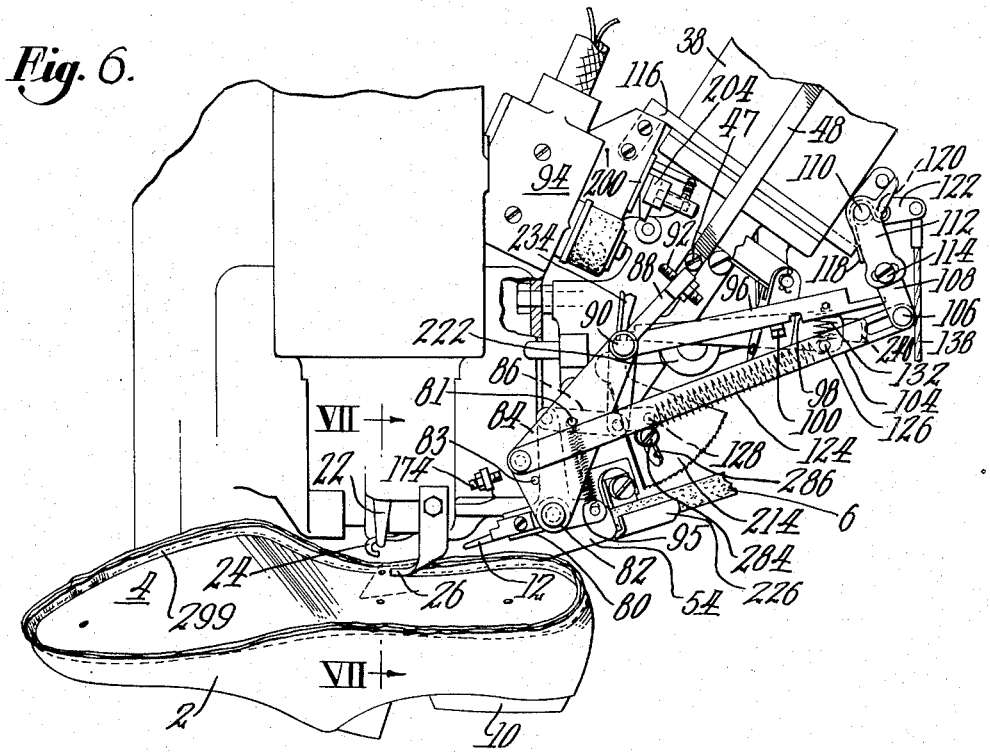
Fig. 6 is a view similar to Fig. 2, showing the position occupied by a sewed heel seat shoe in first presenting it to the stitch-forming devices in the machine at the beginning of a seam.

Referring more particularly to Fig. 9 of the drawings, the shoe being operated upon is composed of an upper 2, a ribbed insole 4, and a welt 6, the shoe parts being attached together by a thread inseam 8 and supported on a last 10 (Figs. 6 and 8). The leading end of the welt 6 already attached to the shoe has been provided previously with a bevel cut and as it moves toward the sewing point in the machine it engages a feeler 12 for controlling the operation of a welt severing knife 14 (see Figs. 2 and 4). The knife 14 is mounted for movement in a fixed path toward and from the welt in advance of a sewing welt guide 16 for directing it into proper relationship with the other parts of the shoe. The control feeler 12 is so located that it engages the welt along the line of the inseam 8 or in close proximity thereto, where the welt is backed rigidly by the last supported bulging surface of the upper 2, as shown in Fig. 9, thus ensuring a positive operation of the feeler. The feeler controls an improved high-speed mechanism for actuating the welt severing knife and the knife is located in a position where it will sever the welt with a bevel cut at a position above and to the rear of the point of engagement of the feeler with the leading end of the welt first attached to the shoe. The knife is actuated with such high speed that feeding movement of the shoe through the machine has no appreciable effect on the severing operation and the seam attaching the parts together is continued without interruption across the joint between the ends of the welt into overlapping relationship with the initial stitches of the seam, the end of the welt in the machine after being severed being held away out of engagement with the attaching devices.

To attach the parts of the shoe together the machine is equipped with the usual chain stitch forming, feeding and guiding devices including a curved hook needle 18 (see Fig. 7), an awl 20, a looper 22 (see Fig. 6), a thread finger 24, a channel guide 26, a back rest 28 (see Fig. 4), and other devices constructed and operating in the same manner as shown in the Morrill patents above referred to. The stitch forming and other devices are actuated by a main sewing cam shaft 30 (Fig. 1) mounted in bearings in a head frame 32 of the machine and the cam shaft is provided at its left end with a hand wheel 34 by means of which an operator is enabled to rotate it manually to bring the stitch-forming devices to any desired stopping position required.

The machine is provided with driving and stopping mechanisms, including a vibrating lever 35 (Fig. 4), a lock bolt carrier 36 and other manually controlled or automatic connections operated by the cam shaft 30 for bringing the machine to rest. The driving and stopping mechanisms are controlled in part by the operator and in part by the automatic connections, which are thrown into operation to stop the machine with the needle retracted from the work and free of the thread.

Control of the driving mechanism is exercised by the operator and is governed by the movements of a foot actuated control treadle, indicated at 37 in Figs. 1 and 22, the machine being started by a downward pressure on the treadle and brought to rest when the treadle is released. It is also possible to bring the machine to rest by partial release of the treadle to an indeterminate position, the stopping mechanism not being thrown into operation until the treadle is fully released.

Figure 2:
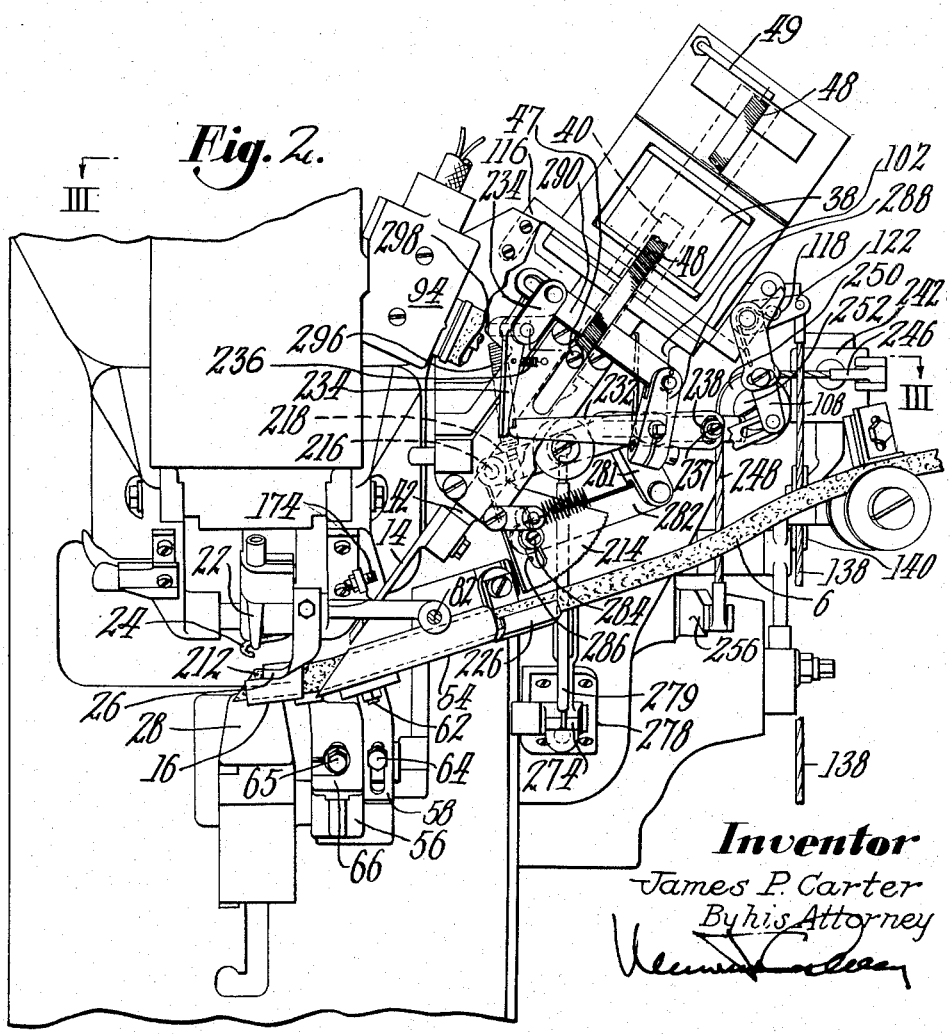
Fig. 2 is a view in front elevation on an enlarged scale of the parts surrounding the sewing point in the machine, including a novel welt severing and advancing mechanism also shown in Fig. 1, certain parts having been broken away to show the underlying construction.

The mechanism for actuating the welt severing knife 14 includes an electromagnetic solenoid 38 having a central movable armature 40 directly connected to the knife (see Figs. 2 and 23). To guide the knife in its movements across the path of the welt, the lower end of the armature 40 is connected to a bar 42 (Figs. 12 and 13) slidingly mounted in a box-like guideway 44 fixedly secured to the machine frame and enclosed by a rectangular cover plate 45 (Fig. 12). To secure the cover plate its corners are perforated to receive screws 46 passing into threaded engagement with the guideway. To retract the armature 40 after the solenoid is de-energized a pin 47 projecting from the bar 42 moves freely in a slot in the cover plate 45 and a spring 48 is stretched between the pin 47 and an angular rod 49 (Fig. 4) at the top of the electromagnetic solenoid. The lower end of the slide bar 42 has a transverse opening through which a stud 50 (Fig. 12) passes from the shank of the knife 14, connecting it rigidly to the knife and the stud is threaded to receive a pair of check nuts 51. The lower end of the knife has a rearward projection and is sharpened with a beveled edge 52 extending at a slight inclination to the widthwise dimension of the welt passing through the sewing guide 16, so that the movement of the knife across the path of the welt will not be met with too abrupt a resistance.

To support the welt against the thrust of the knife 14 and to prevent the welt from buckling between the welt advancing devices and the sewing guide 16, it passes through a loose fitting enclosure 54, shown in Figs. 2, 4 and 12, mounted on a carrier 56 for the sewing welt guide with which it is alined, the knife intersecting the path of the welt between the welt enclosure and the welt guide. To provide clearance for the knife the left end of the enclosure 54 is beveled with an angle corresponding to that between the knife and the path of the welt. Also, the enclosure is spaced sufficiently from the knife to avoid actual contact, the speed of operation of the knife being sufficient to sever the welt with a clean cut surface.

To mount the enclosure 54 on the welt guide carrier 56, the enclosure is formed from a U-shaped section of sheet metal, having a rearwardly extending tongue held in a clamp on a forwardly extending upper arm of an angle bracket 58. The clamp comprises a cover plate 60 and a bolt 62 which when tightened draws the cover plate against the tongue on the enclosure to secure it against the upper arm of the bracket 58. The bracket 58 is in turn secured by a cap screw 64 to an enlargement at the forward end of the welt guide carrier 56.

Figure 3:
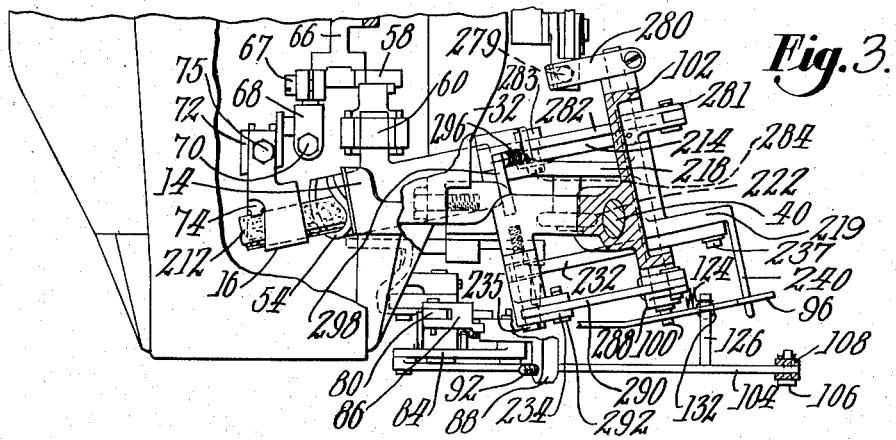
Fig. 3 is a detail plan view partly broken away and in section, looking from the line III—III of Fig. 2.
Figure 7:
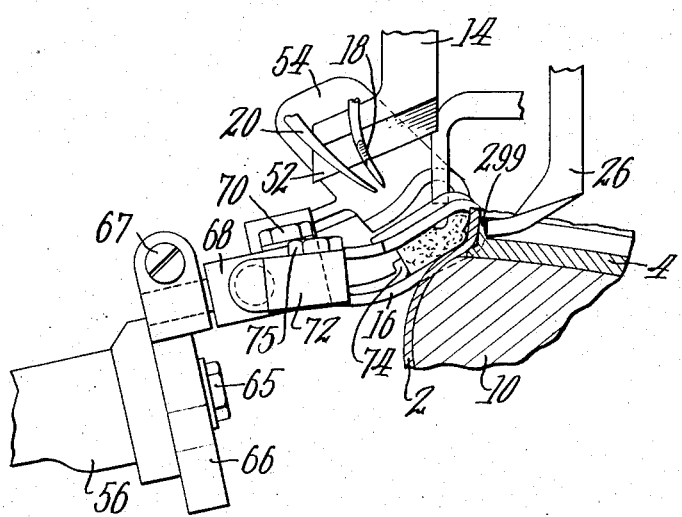
Fig. 7 is an enlarged sectional view taken along the line VII—VII of Fig. 6.

To secure the sewing welt guide 16 to the carrier 56, the enlarged forward end of the carrier has secured to it by a bolt 65 (see Figs. 2 and 7) a plate 66 having a split clamp portion actuated by a screw 67 within which clamp portion is mounted a shank of a swivel block 68. The swivel block 68 also has at its forward end a split clamp portion actuated by a screw 70. Within the clamp portion of the block 68 is a pin extending from a mounting block 72 which projects at right angles to the shank of the swivel block. The mounting block 72 has two channel-shaped guideways fitting the lateral edges on the shanks of the welt guide 16 and an edge gage 74 adjustably mounted within the welt guide. To clamp the welt guide 16 and the edge gage 74 to the mounting block they are perforated to receive a clamp bolt 75 (Figs. 3 and 7).

The spacing between the right end of the welt guide and the left end of the welt enclosure 54 is sufficient to prevent engagement of the knife with the enclosure in any position taken as it moves with the carrier toward and from a shoe being operated upon. This spacing is to accommodate movement of the enclosure 54 toward and from the path of the knife approximately 1/16 of an inch as a result of the mounting for the carrier 56. As brought out in Patent No. 2,041,945, the carrier 56 is in the form of a bar extending downwardly and rearwardly and is supported upon depending pivotally mounted links 76 and 78 (Fig. 4) carried by the head frame of the machine. The proportioning of these links causes the welt guide 16 to follow a path coincident with that of the needle 18, so that the sewing welt guide 16 and the enclosure 54 move vertically as well as horizontally, the spacing of the enclosure from the knife being sufficient to clear the knife from actual engagement under all operating conditions.

Due to the curvatures along the margins of the shoe parts operated upon and the position of the control feeler 12, it is unlikely that the feeler will engage the shoe except along its inside shank portions, as will be explained hereinafter. To avoid any possibility of engagement of the feeler with the welt or any other part of the shoe except inside the shank portion where the inseam is started, the feeler is rendered normally inoperative by raising it to a position entirely out of the range of shoe movements at all times except just before the leading end of the welt attached to the shoe approaches the operating position of the feeler. For this purpose the feeler 12 is secured to one arm of a three-armed lever 80 (see Figs. 6, 8, 23 and 26) fulcrumed on a fixed stud 82 and urged yieldingly in a direction to hold the feeler in a lowered position, shown by the broken lines in Fig. 23. The stud 82 also has mounted upon it the lower corner of a shiftable triangular carrier plate 84.

The carrier plate 84 rotates freely on the stud 82 and is yieldingly connected for joint and relative movement with the three-armed lever 80 to which the feeler is secured, so that clockwise rotation of the carrier plate about the stud causes the feeler to be raised from the range of movement of the shoe. To connect the feeler and its three-armed lever 80 with the carrier plate 84, while still rendering the feeler capable of movement relative to the carrier plate as it detects the presence of the approaching end of the welt, the upper arm of the three-armed lever has pivotally connected to it one end of a horizontal link 86, pivotally connected at its other end with a downwardly extending arm of a lever 88 rotatably mounted on a pin 90 secured in the upper corner of the carrier plate. The lever 88 has an upwardly inclined arm carrying a screw 92 arranged to provide an operative connection between the feeler and an actuating button on a solenoid energizing microswitch 94 whenever the feeler is raised to the solid line position of Fig. 23 by the end of the welt on a shoe.

To hold the feeler yieldingly in an operative lowered position, shown in the broken line position of Fig. 23, a third arm of the lever 80 carries a pin to which is connected a tension spring 95 (see Figs. 4 and 6), the spring being stretched between the pin on the lever 80 and a pin 81 on the carrier plate 84. A pin 83 on the carrier plate 84 limits the movement of the lever 80 in a counterclockwise direction relatively to the plate. When the feeler is actuated by the welt end against the yielding force of the spring 95 the lever 88 is rocked through the link 86 by the three-armed lever, the carrier plate 84 being held locked against movement in a stationary position while the feeler is being actuated relatively to the carrier plate by the welt.

To lock the carrier plate 84 in a stationary position after the feeler 12 has been moved toward the shoe into operative position, the pin 90 on the plate has loosely surrounding it one end of a latch 96 extending toward the right side of the machine (Figs. 6 and 8). The latch 96 is formed with a rectangular notch 98 fitting the squared forward end of a horizontal shaft 100. The shaft 100 is mounted for rotation in spaced bearings formed in a bracket 102 (see Fig. 3) secured to the head frame 32.

When the latch 96 is disengaged from the shaft 100, the plate 84 (Fig. 6) is rotated in a clockwise direction by a link 104 pivotally connected at its left end to the plate 84 and formed with a slot at its right end embracing a pin 106 passing through the forked end of an arm 108, within the fork of which the link 104 slides. The arm 108 is loosely supported on a horizontal shaft 110 and is adjustably clamped to a second arm 112 (see Fig. 6) having an arcuate slot through which passes a screw 114. The screw 114 also enters a threaded opening in the arm 108. The arm 112 is fixed to the forward end of the horizontal shaft 110, which is rotatably mounted in bearings projecting to the right from a fixed plate 116 (see Figs. 4 and 26) secured to the head frame 32. Between the bearings on the plate 116 the shaft 110 carries a torsion spring 118 (Figs. 4 and 26), one end of which engages the plate 116 and the other end of which engages a pin 120 projecting from an arm 122 secured to the rearward end of the shaft 110. When the latch 96 releases the plate 84, the spring 118 rotates the carrier plate in a clockwise direction and moves the switch actuating screw 92 away from the energizing microswitch button and the feeler out of the range of movement of the shoe. To limit the movement of the actuating screw 92 away from the energizing microswitch 94 the fixed plate 116 carries a pin 123 (Figs 4 and 26) which engages a finger portion of the arm 112 when the spring 118 acts.

The link 104 does not form a rigid connection between the feeler carrier plate 84 and the arm 108 but the carrier plate is capable of yielding movement with relation to the arm 108 for a reason which will appear more fully hereinafter. To form a yielding connection between the carrier plate 84 and the arm 108, the link 104 is acted upon by a tension spring 124 (see Figs. 6, 12 and 26) stretched between a pin 126 on the link 104 and a pin 128 projecting from an anchor strip 130 retained in position on the guideway for the knife bar by two of the screws 46 (Fig. 12) which pass through it. As the arm 108 is actuated to move the control feeler into a position where it will engage the leading end of a welt first attached to a shoe, the notch 98 in the latch 96 engages the forward end of the shaft 100 limiting further movement of the feeler carrier plate 84. The yielding connection provided by the spring 124 enables the arm 108 to continue its movement after the carrier plate has been stopped by the notch in the latch, the spring 124 serving to hold the carrier plate in position until the latch 96 is securely seated with its notch in surrounding relation to the squared end of the shaft 100. To limit the movement of the carrier plate the notch 98 has its right edge extending downwardly below that of its left edge, and to draw the latch against the shaft the pin 126 on the link 104 is engaged by the lower end of a tension spring 132 having its upper end engaged with a pin on the latch 96.

To move the control feeler into the range of movement of a shoe being operated upon, the illustrated machine is provided with a safety release operated at the will of the machine operator and connected to a knee lever instead of by a hand actuated latch lever as in the machine of the Ashworth et al. patent. The safety release of the illustrated machine comprises the arm 122 secured to the rearward end of the shaft 110, a fixture 136 pivotally connected to the arm 122 by a pin 134 (see Fig. 26) and a nonrigid cable 138 secured at one end to the fixture 136, extending downwardly past a grooved wheel 140 (see Fig. 1) rotatably mounted on the sewing head, beneath a grooved wheel 142 (see also Fig. 22) rotatable on a supporting column 144 for the machine head frame, horizontally about a grooved wheel 146 rotatable beneath a work shelf 148 secured to the column 144 and downwardly over a grooved wheel 150 rotatably mounted on a bracket 152 secured to the underside of the shelf 148. The lower end of the cable 138 is secured in a clamp on a horizontal arm of a bell crank 154 fulcrumed on a bracket 156 secured to the column 144. A vertical arm of the bell crank 154 has pivotally connected to it one end of a link 158, the other end of which is similarly connected to the knee lever, indicated at 160, rotatable on a pin 162 mounted in a fixture 164 secured to the underside of the shelf 148. The upper end of the knee lever 160 is divided to receive a downwardly extending flange on the fixture 164. The upper end parts of the knee lever are threaded to receive a pair of set screws 166 acting at either side of the flange on the fixture 164 to limit the forward and rearward movements of the knee lever.

At its lower end the knee lever 160 has secured to it a block 168 within which is clamped a horizontal bar 170 having a knee pad 172 secured at its outer end. The position of the knee pad is such that it is engaged by an operator's leg just above his knee cap so that inward pressure against the pad draws the cable 138 downwardly and rotates the shaft 110 in the proper direction to move the feeler into active position where it is held by the latch 96. Movement of the control feeler into active position results in movement of the actuating screw 92 toward the microswitch 94 at a time selected by the operator just before the leading end of the welt first attached to a shoe reaches the position of the feeler. Arrangement of the knee lever in place of a hand lever is advantageous in that it does not require release of the shoe being operated upon from either of the operator's hands. Precaution is usually taken in the operation of the present safety release knee lever to actuate it only after any irregularities on the shoe upper, such as a vamp seam have been passed. Even when the machine is running at full speed, however, there is no difficulty in operating the safety release a few stitches in advance of the point where the welt engages the feeler.

While it is possible to adjust the machine in a manner to cause the control feeler 12 to engage the upper in advance of the leading welt end first attached to a shoe it has been found desirable to arrange the feeler so that after being moved to active position it is engaged only by that part of the leading welt end which rests firmly against the bulging last supported shoe upper without actually coming into contact with the shoe upper. To prevent the control feeler from engaging the shoe upper before being actuated, the carrier plate 84 when shifted by the safety release knee lever is limited in its counterclockwise movement by engagement with a stop screw 174 (see Figs. 2 and 6). The stop screw 174 is threaded in a forwardly projecting lug of the sewing head frame and by rotating the screw an accurate adjustment for the active position for the feeler may be obtained.

The knee lever 160 not only actuates the safety release to bring the control feeler 12 into active position but also closes an auxiliary safety switch, in circuit with the electromagnetic solenoid 38, which circuit when held open prevents actuation of the welt severing knife. For this purpose the downwardly extending arm of the bell crank 154 (Fig. 22) has a laterally projecting lug carrying a switch actuating screw 176 threaded through it (see also Fig. 23). The screw 176 is movable with the lever 154 toward and from a microswitch 178. To retract the knee lever from safety releasing position the downwardly extending arm of the bell crank 154 has a tension spring 180 stretched between it and the pin 162.

By reason of the nonrigid cable 138 connected from the safety release to the knee lever 160, the knee lever may be returned to its inoperative position after being depressed by the operator if required. Return of the knee lever to its inoperative position causes the safety release microswitch 178 to open the circuit to the solenoid 38 and thus prevents actuation of the knife-actuating mechanism. Preventing actuation of the knife mechanism without requiring the feeler 12 to be moved from a position of engagement with the leading end of the welt 6, may be desirable in some instances where an unforeseen obstruction appears on a shoe being sewn after the safety release has been rendered inoperative. After returning the knee lever to inoperative position the machine may then be stopped without severing the welt or the welt may be severed before or after stopping merely by depressing the knee lever a second time, the carrier plate for the feeler 12 remaining latched in operative position and the feeler being held actuated by the welt.

The safety release and circuits for energizing the knife actuated solenoid 38 are best shown in Fig. 23. The energizing circuit has interposed in it the normally open safety microswitch 178, a conductor 182 leading to the energizing circuit from the microswitch 178, and a conductor 184 connected between the microswitch 178 and one side of a main line switch 186. The line switch 186 is arranged to supply power from an alternating current line 188 which is also connected by a conductor 190 with a low pressure gas glow tube 192, which serves as a power indicator. The test circuit for the indicator tube includes a ballast resistance 194, a manually actuated double throw toggle test switch 196, and a conductor 198 connected between the test switch and the line switch 186. When the line switch 186 is closed, and the test switch is at "off" position the glow tube is lighted dimly through the ballast resistance 194, as indicated by "Glo," the line switch 186 also controlling certain auxiliary and heating circuits (not shown) in the machine.

The toggle test switch 196 when thrown to "on" position opens the indicator glow tube test circuit while the energizing circuit to the solenoid 38 is open at other points. When shifted to "on" position, the test switch causes the indicator test circuit to be included in the solenoid circuit, omitting the ballast resistance, so that the glow tube is extinguished except when the solenoid is about to be energized. Energization of the solenoid circuit causes the glow tube to light, when the safety release microswitch 178 is closed. For mounting the test switch 196 and the indicator tube 192 they are secured in an outlet box 198 (Fig. 1) made fast to the head frame 32 near its upper end.

Figure 15:
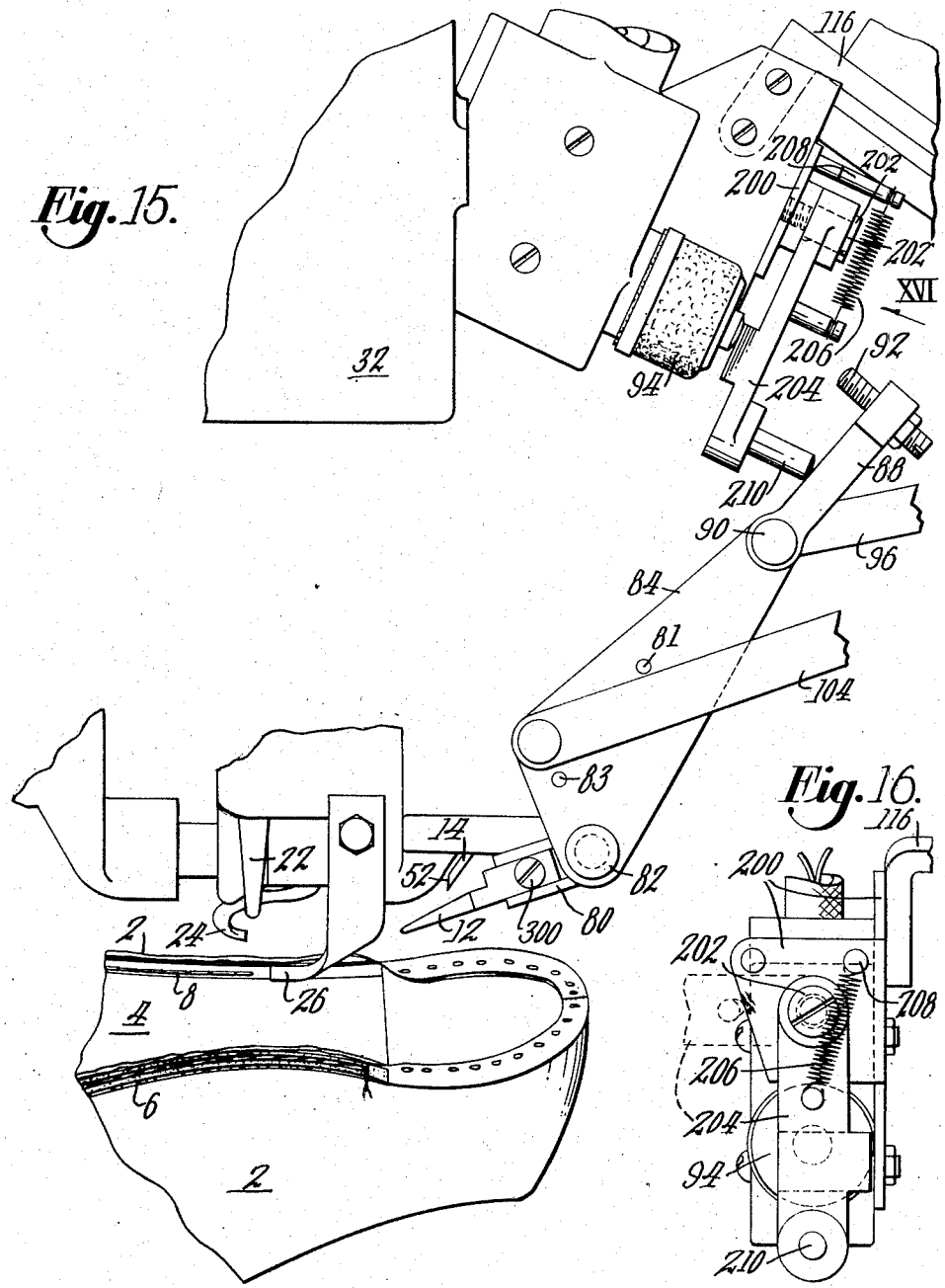
Fig. 15 is a detail view in front elevation showing an adjustment of the parts of the welt severing mechanism for rendering the machine adaptable for sewing an inseam extending from heel-breast line to heel-breast line in a shoe.
Figure 16:
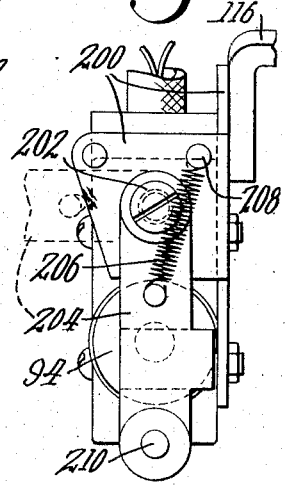
Fig. 16 is a detail side view of some of the parts shown in Fig. 15, looking in the direction of the arrow XVI.

To enable the machine to operate on conventional Goodyear welt shoes in which the welt is attached to the insole and upper along the forepart of the shoe from heel-breast line to heel-breast line only, the control feeler 12 is rendered inoperative and the energizing switch 94 is held closed, so that the welt severing knife will be actuated whenever the knee pad 172 is depressed. For this purpose there is located just above the energizing microswitch 94 an angle plate 200 (see Figs. 6, 8, 12, 15 and 16) secured to a downwardly extending arm of the mounting plate 116 (see Figs. 15 and 16). In one flange of the angle plate 200 is threaded a shoulder screw 202 (Figs. 15 and 16) on which is rotatably mounted an interponent arm 204 having a cam surface formed to engage and depress the button of the energizing switch 94 (solid line positions of Figs. 15 and 16). To hold the arm 204 in button-depressing position, a pin on the arm is engaged by one end of a toggle spring 206 having its other end engaged with a pin 208 on the flange of the angle plate. The arm 204 also carries a stud 210 which projects into the path of the lever 88 to block its movement toward the microswitch 94 and to prevent rotation of the carrier plate 84 about its stud 82 in a counterclockwise direction, the pin 106 moving idly along the slot in the link 104 whenever the knee pad 172 is depressed. The spring 206 moves across the screw 202 as the interponent arm 204 is shifted about its screw, holding the arm either in the solid line position shown in Figs. 15 and 16 with the microswitch 94 closed, or in the broken line position of Fig. 16 out of the range of movement of the set screw 92 on the lever 88.

The knife 14 being mounted for movement across the path of the welt in advance of the sewing guide and of the point of operation of the stitch-forming devices (Fig. 12) leaves a severed end of the welt remaining in the machine at a position where it will not be engaged by the stitch-forming devices when the machine is restarted. To prepare the machine for operation on a new shoe the welt is advanced through the enclosure 54, which is mounted in alinement with the sewing welt guide 16, and across the point of operation of the stitch-forming devices, as illustrated in Figs. 2 and 3. This is accomplished after the knife is actuated and the machine has been brought to rest with the needle disengaged from the work, so that the shoe may readily be removed from the machine. Accordingly, the shoe does not interfere with the advancing movement of the welt and the machine is ready for restarting shortly after having been stopped.

Figure 25:
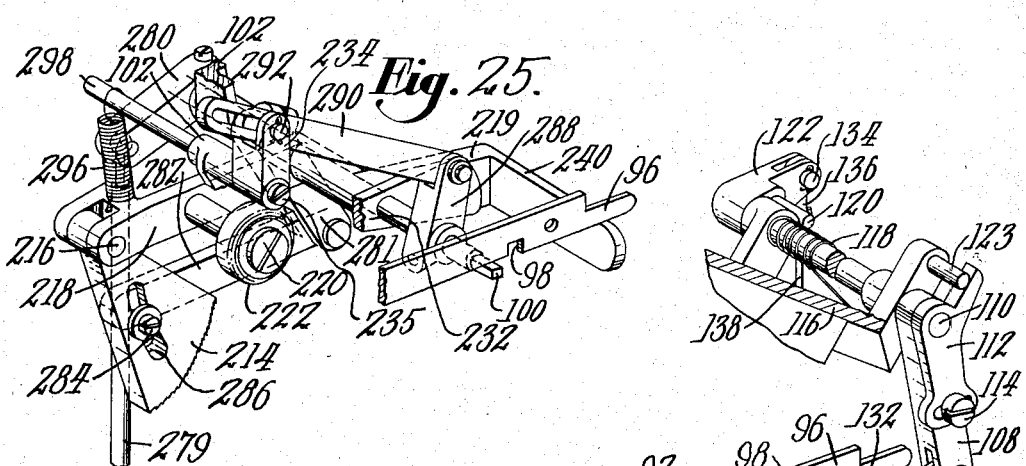
Fig. 25 is a perspective view of parts of a welt advancing mechanism.

To advance the severed end of welt, indicated at 212, remaining in the machine across the point of operation of the stitch-forming devices after the machine has come to rest at the end of a seam, a suitable mechanism is provided acting after the welt is severed. The welt advancing mechanism engages a portion of the welt just before it enters the enclosure 54 and includes a welt advancing, toothed segment 214 rotatably mounted on a pin 216 passing through the forked end of a radius arm 218 on a lever also having a second arm 219 (see Figs. 4, 13, and 25), the segment 214 being mounted for rotation on the pin 216 between the forked portions at the end of the radius arm. The radius arm 218 has an elongated hub loosely surrounding the central part of the shaft 100, as shown in Figs. 3 and 25. Between its ends the radius arm supports a threaded end of an eccentric stud 220 (Fig. 13) on the eccentric portion of which is rotatable a roll 222 and forms with a second arm 219 a lever, the purpose of which will be described.

The welt advancing mechanism is normally inoperative but is rendered operative by connections controlled by the knife-actuating mechanism. These connections comprise a cam projection 224 on the slide bar 42 which engages the roll 222 and forces the teeth of the segment 214 downwardly against the welt, gripping the welt within a trough of a C-shaped plate 226, shown in Figs. 4 and 12. The plate 226 is mounted on the head frame 32 by a screw 228 passing through it and into a threaded opening in the frame. The screw 228 also passes through an edge gage plate 230 for confining the welt along the portion engaged by the advancing segment 214. After being moved bodily against the welt the toothed segment 214 is retained in welt-engaging position by a pawl arm 232 (see Figs. 2 and 3) surrounding the shaft 100 and a latch lever 234 engages the pawl arm. The latch lever is fulcrumed on a screw 235 threaded into the bracket 102 and is urged into latching engagement with the pawl arm by a spring 236 (Fig. 12) stretched between a pin on the latch lever and a pin on the cover plate 45. The pawl arm 232 is secured to the second arm 219 on the lever 218, 219 (see Fig. 3) by a clamp screw 237 passing through a slot in the pawl arm 232 and into threaded engagement with the second arm 219 of the lever. The clamp screw 237 also has surrounding it a washer 238 (Fig. 2) beneath its head to take up the thrust of the clamping pressure. While the radius arm 218 of the lever 218, 219 moves downwardly with the welt advancing segment 214, the second arm 219 on the lever 218, 219 moves upwardly and a forwardly extending finger 240 (Figs. 3 and 12) thereon raises the latch 96 from engagement with the forward end of the shaft 100, releasing the feeler carrier plate 84 for clockwise swinging movement about its mounting stud 82. The force of the torsion spring 118 is greater than that of the tension spring 124, so that the torsion spring then swings the carrier plate clockwise against the force of the tension spring 124 which opposes the spring 118 in a direction to move the feeler 12 away from operative position.

After the welt is severed and the severed end remaining in the machine is engaged by the welt advancing segment 214, the stitch-forming devices continue in operation until the welt is completely attached to the shoe and the final stitches overlap those first inserted in the leading end of the welt. The operator then permits the foot treadle 37 to rise and the stopping mechanism brings the machine to rest in the usual manner. As the machine comes to rest connections between the stopping mechanism and the welt-advancing mechanism cause the advancing mechanism to be operated. These connections comprise an arm of a pivoted lever 242 (see Figs. 2 and 4) extending across the right end of the main cam shaft 30 and are actuated in a manner more fully described in United States Letters Patent No. 2,520,140, granted August 29, 1950, upon application of O. R. Haas. The lever 242 is fulcrumed on a fixed pin 244 (Fig. 4) at the rear of the cam shaft 30 and at its forward end the lever 242 is pivotally connected with a fixture 246 to which is secured one end of a cable 248. From the fixture 246 the cable 248 passes to the left and downwardly about a grooved wheel 250 rotatable on a screw 252 threaded into a fixed bracket 254 (Fig. 4) on the machine frame. At the lower end of the cable 248 is a similar fixture pivotally connected to a one-revolution clutch 255 and a tripping arm 256. The tripping arm is secured to a rockshaft 258 which also carries a stop arm 260 for controlling the one-revolution clutch surrounding a shaft 262. When the arm of the pivoted lever 242 is actuated it disengages the stop arm 260 from the one-revolution clutch, causing the shaft 262 to rotate. The right end of the shaft 262 has a cam 264 arranged to engage a shifter lever 266 which acts in a manner described in the Haas patent to prevent more than one revolution of the shaft 264 when the machine is stopped. The one-revolution clutch is provided with an eccentric surrounded by a strap 268 pivotally connected to a segment 270. The segment 270 is also pivotally connected to a link 272 extending forwardly of the machine and similarly connected to an upstanding arm of a right-angle lever 274 rotatable on a fulcrum stud 276 carried by a bracket 278 fixed to the sewing head frame 32.

The one-revolution clutch of the shaft 262 when actuated causes the link 272 to be reciprocated and the right-angle lever 274 to be oscillated on its fulcrum stud, the oscillation occurring after the sewing shaft has come to rest. The oscillation of the right-angle lever 274 is transmitted to the welt advancing segment 214 through a vertical link 279 pivotally connected at its lower end to a horizontal arm of the lever 274 and at its upper end to an arm 280 (see Figs. 3 and 25) clamped to the rearward end of the shaft 100. Also clamped to the shaft 100 is an arm 281 pivotally connected to a bar 282 surrounding loosely at its left end a reduced portion of a headed stud 283 (see Fig. 3). The stud 283 is threaded internally to receive a screw 284. The screw 284 passes through an arcuate slot 286 in the segment 214 to which the stud is adjustably clamped by the screw against the rear side of the welt-advancing segment 214, the arrangement being such that the oscillation of the right-angle lever 274 moves the welt lengthwise from the enclosure 54 into the sewing welt guide 16.

To prevent retraction of the welt from the guide 16 during the return stroke of the segment 214, the shaft 100 has secured to it just behind its forward squared end an arm 288 (see Figs. 3, 12 and 25) forming one member of a train of connections for releasing the latch lever 234 from the pawl arm 232. The upper end of the arm 288 is pivotally connected to one end of a link 290, the other end of which has a slot surrounding a pin 292 on the upper arm of the latch lever 234. By reason of the connection provided by the slot and pin connection between the link 290 and the latch lever 234, the latch lever 234 releases the pawl arm 232 after the segment 214 advances the welt, so that the radius arm and the advancing segment 214, to which the pawl arm 232 is connected are released for upward movement. To move the radius arm and segment 214 upwardly when released by the latch lever 234, a tension spring 296 (see Figs. 2, 3 and 25) is stretched between the radius arm 218 and a pin 298 on the bracket 102. The latch lever 234 releases the pawl arm 232 at the end of the welt advancing stroke of the segment 214 to insure that during the return stroke of the segment it is disengaged from the welt and accordingly does not retract the welt.

After the welt advancing segment 214 is returned to its original position, the machine is ready for renewed operations on a shoe. The advanced end 212 of welt remaining in the machine having been moved into line with the point of operation of the stitch-forming devices is engaged by the needle during its first penetrating stroke when the machine is started. In case of thread breakage or other improper operation of the machine it may be stopped in the usual way without causing actuation of the welt severing knife. If a sewed heel seat shoe is operated upon, the feeler 12 is shifted to operative position just before the welt end approaches the position of the feeler, the operator depressing the knee pad 172 at the proper time to move the feeler into operative position and to close the safety release microswitch 178. If a heel-breast line to heel-breast line seam is to be inserted in a shoe the interponent arm 204 is shifted into the position shown in Figs. 15 and 16, so that the feeler is held from movement into operative position and the energizing microswitch 94 is held closed. Under these conditions when the operator depresses the knee pad 172 the safety release microswitch 178 completes the circuit to the knife actuating solenoid 38 to sever the welt. Ordinarily this is accomplished after the machine is brought to rest but under some circumstances after attainment of skill by an operator it is possible to actuate the welt severing knife while the sewing operations are continuing. By bringing the machine to rest after the knife has been actuated the short length of welt extending between the sewing point and the point where the knife engages the welt is sewn into the seam, thus avoiding welt wastage and the necessity for trimming a surplus end of the welt from the shoe.

Figure 24:
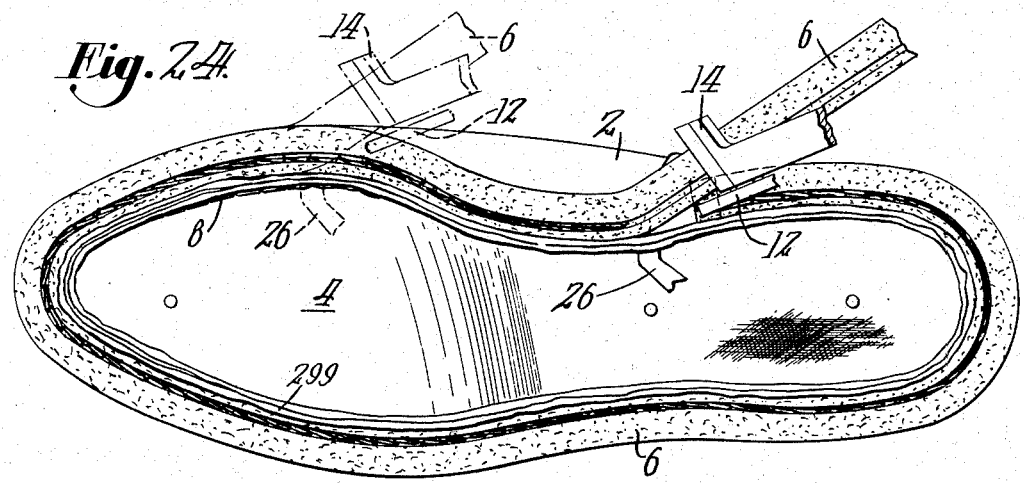
Fig. 24 is a bottom plan view of a shoe as an inseam is about to be completed.
Figure 26:
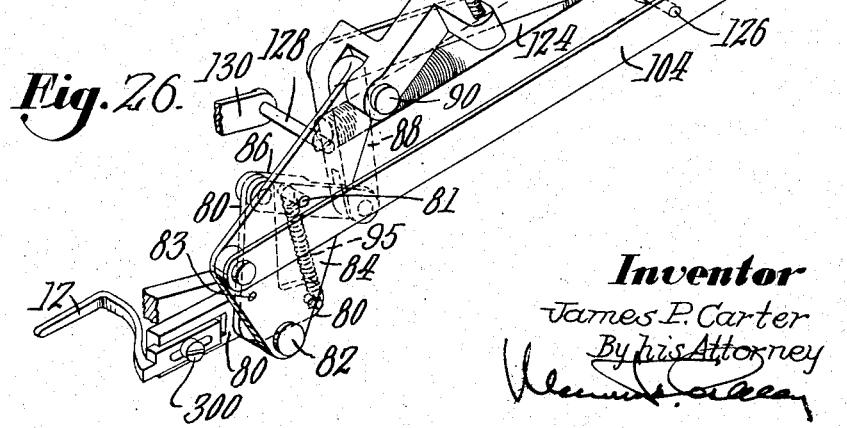
Fig. 26 is a similar view of the connection between the feeler and the mechanism for severing the welt.

The welt-engaging feeler 12 is best shown in Figs. 5 and 26. The feeler is secured to the three-armed lever 80 near the front of the machine, extends rearwardly when in operative position, and then is bent downwardly through an angle of approximately 90° to a position in advance of and at the rear of the channel guide 26, where it will engage the welt only along the concave curvature of the shoe shank (see solid line position of Fig. 24). Along any convex portion of the shoe the feeler is incapable of engaging the welt, as shown in the broken line position of Fig. 24, the outer edge of the welt being inclined downwardly toward the bulging last supported shoe upper. The channel guide determines the point of engagement of the needle with the sewing rib, indicated at 299, of the shoe, and also determines generally the point on the welt engaged by the feeler.

The feeler 12 is provided with a shank portion through which passes a screw 300 (see Fig. 26) for securing it to the three-armed lever 80, the three-armed lever being channeled to fit the shank of the feeler 12 to prevent relative movement of the lever and feeler. Under most conditions the feeler is actuated with uniformity and reliability at the proper position of a shoe to cause the welt end in the enclosure 54 to be severed with a bevel cut matching the leading end of the welt already attached to the shoe. However, with extremely light, porous welt, especially when tempered to a flaccid condition, the leading end of the welt may not possess sufficient rigidity to actuate the feeler reliably. With an extremely flaccid welt its free corner not being attached to the shoe may be brushed aside by the feeler and doubled over on the sewing rib before the feeler is actuated. Accordingly, the free corner may be attached by the inseam in such doubled-over position.

To insure reliable operation of the feeler 12 when engaged by a light-weight, well-tempered welt 301, the illustrated machine is provided with a yieldingly mounted welt deflecting finger 302, best shown in Figs. 17 to 20, inclusive. The finger 302 is formed with a plow-shaped head which is pressed against the shoe upper and a circular shank slidably mounted in a sleeve-like portion of an offset bracket 304 secured to the forward end of a curved slide 306 (Fig. 18) for supporting the back rest 28. The back rest is pressed against a shoe by a spring 307 more fully described in Patent No. 2,041,945. Both the back rest 28 and the welt deflecting finger 302 engage the bulging last supported surface of the shoe upper 2. The head of the welt deflecting finger 302 is so shaped that it engages the leading end of the welt attached to the shoe before it reaches the feeler 12, causing the welt end along its rear edge at its free corner to be raised somewhat away from engagement with the bulging last supported shoe upper. When the end of the welt actually engages the feeler 12, there is no opportunity for the free corner to be folded over the sewing rib or brushed aside by the feeler, the position of the welt being such that downward pressure of the feeler forms a central depression or trough in the leading end of the welt, leaving the free corner of the welt undeflected. Thus, the possibility that the free corner of the welt will be doubled over the sewing rib 299 and stitched while so held is largely avoided. With the use of the deflecting finger 302 the welt is backed at the point of feeler engagement in part by the last supported surface of the upper and in part by the finger 302.

To provide a yielding mounting for the deflecting finger 302 so that no damage to or interference with the shoe will be experienced as the shoe is first presented to the machine by the operator, the shank of the finger is acted upon by a light compression spring 308 enclosed in the sleeve portion of the bracket 304. To limit rotation of the finger in the bracket the shank of the bracket is slotted along opposite sides, the slot being of larger width than the ends of a loose fitting pin 310 extending diametrically through the shank of the finger. An opening 312 is provided at the end of the sleeve portion for escape of air as the shank of the finger slides in the bracket. The spring 304 exerts a weaker force on the deflecting finger than that exerted on the back rest 28 by the spring 307 so that the back rest always engages the bulging shoe upper in the usual way. Also, the use of a smaller welt guide and enclosure may be required while operating upon the light-weight welt 301.

By the construction described a machine is provided with a welt severing knife mechanism controlled by a feeler mounted for engagement with the leading end of a welt on a shoe, at a point backed by the bulging last supported portion of the shoe upper. Also, as illustrated and described, a feeler controlled welt severing knife actuating mechanism is provided which meets all of the limitations and requirements of a Goodyear welt shoe inseam sewing machine for forming a single thread chain stitch inseam inserted with its ends in substantial overlapping relation and with a welt attached thereby having matched and butted ends to form a well-fitted, inconspicuous joint along the overlapping end sections of the seam.

Referring to Figs. 10 and 11, the inseam 8 attaches the welt 6 and the lasted upper 2 to the sewing rib 299 of the insole 4. The butted joint between the matched ends of the welt is indicated at 314 and the overlapping ends of the inseam extend over the distance 316 between the dot-dash lines 318, 320, thus reinforcing the joint of the welt. The advantage of inserting a seam in this manner with a single continuous thread obviously is that maximum reinforcement for the joint in the welt is obtained with greatest efficiency, there being less likelihood for thread breakage when the shoe is worn than where no reinforcement is made in the inseam, particularly along the joint. Because the seam is inserted with a continuous thread without stopping the machine, particularly along the overlapping ends of the seam, a uniform thread tension results throughout the completed seam. Also, in any prior welt shoe inseam sewing machine it has not been possible to form a welt attaching inseam with a butted joint between matched ends of a welt and at the same time to insert an inseam with uniform tension in overlapping ends.

The nature and scope of the invention having been indicated and a particular embodiment having been described, what is claimed is:

1. A shoe machine for attaching a welt to a last supported shoe upper and a sole member, said machine having attaching, feeding and guiding devices for the shoe parts, and a welt severing knife mounted for movement toward and from the welt as it passes through its guiding device at a point in advance of the attaching devices, in combination with means for actuating the knife comprising a feeler mounted for yielding movement during sewing operations toward a bulging last support portion of the upper to engage the leading end of the welt already attached to the shoe at a point backed by the bulging upper and to be actuated away from the bulging upper by the leading welt end as it approaches the attaching devices.

2. A shoe machine for sewing a welt to a last supported shoe upper and a sole member, said machine having stitch forming, feeding and guiding devices for the shoe parts, and a welt severing knife mounted for movement toward and from the welt at a point in advance of the stitch forming devices, in combination with means for actuating the knife comprising a feeler mounted for yielding movement during sewing operations toward a bulging last supported portion of the shoe upper to a position of engagement with the leading end of the welt already sewn to the shoe at a point backed by the bulging upper and to be actuated away from the bulging upper by the leading welt end as it approaches the stitch forming devices.

3. A shoe machine for sewing a welt to a last supported shoe upper and a sole member, said machine having stitch forming, feeding and guiding devices for the shoe parts, a sewing shaft for actuating said devices, driving and stopping mechanisms for the sewing shaft, a control treadle for the driving and stopping mechanisms and a welt severing knife mounted for movement toward and from the welt as it passes through its guiding device at a point in advance of the stitch forming devices, in combination with means for actuating the knife, comprising a feeler mounted for movement toward and from a bulging last supported portion of the upper of a shoe presented to the stitch forming devices to engage the leading end of the welt already sewn to the shoe as that end approaches the stitch forming devices, mechanism for advancing toward the stitch forming devices the end of welt remaining in the machine after being severed by the knife, connections controlled by the knife means for rendering the advancing mechanism operative, and connections between the stopping mechanism and the welt advancing mechanism including a one-revolution clutch for actuating the welt advancing mechanism.

4. A shoe machine for sewing a welt to a last supported shoe upper and a sole member, said machine having stitch forming, feeding and guiding devices for the shoe parts, a sewing shaft for actuating said devices, driving and stopping mechanisms for the sewing shaft, a control treadle for the driving and stopping mechanisms and a welt severing knife mounted for movement toward and from the welt as it passes through its guiding device at a point in advance of the stitch forming devices, in combination with mechanism for actuating the knife, comprising a feeler mounted for movement toward and from a bulging last supported portion of the upper of a shoe presented to the stitch forming devices to engage the leading end of the welt already sewn to the shoe as that end approaches the stitch forming devices, mechanism for advancing toward the stitch forming devices the end of welt remaining in the machine after being severed by the knife, connections controlled by the knife mechanism for rendering the advancing mechanism operative, connections between the stopping mechanism and the welt advancing mechanism for actuating the welt advancing mechanism, and a knee lever for rendering the welt severing knife mechanism operative under the control of the operator.

5. A shoe machine for sewing a welt to a last supported shoe upper and a sole member, said machine having stitch forming, feeding and guiding devices for the shoe parts, and a welt severing knife mounted for movement toward and from the welt at a point in advance of the stitch forming devices, in combination with mechanism for actuating the knife comprising a feeler mounted for movement toward and from a shoe to engage and to be raised by the leading end of the welt already sewn to the shoe as that end approaches the stitch-forming devices, a shiftable carrier plate with which the feeler is yieldingly connected for joint and relative movement, and means for locking the carrier plate against movement while the feeler is engaged by the welt.

6. A shoe machine for sewing a welt to a last supported shoe upper and a sole member, said machine having stitch forming, feeding and guiding devices for the shoe parts, and a welt severing knife mounted for movement toward and from the welt at a point in advance of the stitch forming devices, in combination with mechanism for actuating the knife comprising a feeler mounted for movement toward and from a shoe to engage and to be raised by the leading end of the welt already sewn to the shoe as that end approaches the stitch-forming devices, a shiftable carrier plate, means for locking the carrier plate against movement while the feeler is engaged by the welt, and connections including yielding means between the feeler and the carrier plate to enable the feeler to be moved by the welt while the carrier remains stationary.

7. A Goodyear welt shoe inseam sewing machine for attaching a welt to a last supported shoe upper and a sole member, said machine having stitch forming, feeding and guiding devices for the shoe parts including a welt guide movable to engage a shoe as it is tipped and turned to present it to the stitch-forming devices, a welt severing knife mounted for movement toward and from the welt at a point in advance of the stitch-forming devices, and electromagnetic means for actuating the knife, in combination with means for energizing the electromagnetic means including a feeler mounted for yielding movement toward the shoe being operated upon to engage the leading end of the welt already sewn to the shoe and to be actuated away from a last supported portion of the shoe upper as that end approaches the stitch-forming devices, and an energizing switch positioned to be actuated by the feeler and connected in circuit with the electromagnetic actuating means.

8. A Goodyear welt shoe inseam sewing machine for attaching a welt to a last supported shoe upper and a sole member, said machine having stitch forming, feeding and guiding devices for the shoe parts including a welt guide movable to engage a shoe as it is tipped and turned to present it to the stitch-forming devices, a welt severing knife mounted for movement toward and from the welt at a point in advance of the stitch-forming devices, and electromagnetic means for actuating the knife, in combination with means for energizing the electromagnetic means including a feeler mounted for movement toward the shoe being operated upon to engage the leading end of the welt already sewn to the shoe at a point backed by the bulging upper and to be actuated away from a last-supported portion of the shoe upper by the leading welt end as it approaches the stitch-forming devices, an energizing switch positioned to be actuated by the feeler and connected in circuit with the electromagnetic actuating means, a safety switch in circuit with the electromagnetic means for preventing actuation of the knife until the safety switch is closed, and means controlled by the operator of the machine for closing said safety switch.

9. A Goodyear welt shoe inseam sewing machine for attaching a welt to a last supported shoe upper and a sole member, said machine having stitch forming, feeding and guiding devices for the shoe parts including a welt guide movable to engage a shoe as it is tipped and turned to present it to the stitch-forming devices, a welt severing knife mounted for movement toward and from the welt at a point in advance of the stitch forming devices and a control treadle for starting and bringing the machine to rest, in combination with electromagnetic means for actuating the knife comprising a feeler mounted for movement toward and from the shoe being operated upon, a solenoid having an armature connected to the knife, a solenoid energizing switch operatively connected to the feeler, a normally open safety release switch in circuit with the solenoid, and a knee lever operatively connected to the safety release switch for rendering the knife actuating means operative or inoperative under control of the operator.

10. A shoe machine for sewing a welt to a last supported shoe upper and a sole member, said machine having stitch forming, feeding and guiding devices for the shoe parts, a welt severing knife mounted for movement toward and from the welt at a point in advance of the stitch forming devices and a control treadle for starting and bringing the machine to rest, in combination with electromagnetic means for actuating the knife comprising a feeler mounted for movement toward and from the shoe being operated upon, a solenoid having an armature connected to the knife, a solenoid energizing switch operatively connected to the feeler, a normally open safety release switch in circuit with the solenoid, a knee lever operatively connected to the safety release switch for rendering the knife actuating means operative or inoperative under control of the operator, and connections between the feeler and the knee lever for moving the feeler toward the shoe being operated upon when the safety switch is closed.

11. A shoe machine for sewing a welt to a last supported shoe upper and a sole member, said machine having stitch forming, feeding and guiding devices for the shoe parts, a welt severing knife mounted for movement toward and from the welt at a point in advance of the stitch forming devices and a control treadle for starting and bringing the machine to rest, in combination with electromagnetic means for actuating the knife comprising a feeler mounted for movement toward and from the shoe being operated upon, a solenoid having an armature connected to the knife, a solenoid energizing switch operatively connected to the feeler, a normally open safety release switch in circuit with the solenoid, a knee lever operatively connected to the safety release switch for rendering the knife actuating means operative or inoperative under control of the operator, connections between the feeler and the knee lever for moving the feeler toward the shoe being operated upon when the safety switch is closed, said connections including a nonrigid member to enable the safety switch to be opened without moving the feeler away from the shoe, and means for locking the feeler connections after the feeler has been moved toward the shoe.

12. A welt sewing machine for operating upon a shoe, said machine having stitch forming, work feeding and guiding devices for the shoe parts, a welt severing knife, a slide bar connected to the knife and formed with a cam projection, and electromagnetic means for actuating the slide bar, in combination with normally inoperative mechanism for advancing a severed end of the welt across the point of operation of the stitch-forming devices, comprising a toothed member normally out of engagement with the welt, and means operated by the cam projection on the slide bar for forcing the toothed member against the welt when the knife is actuated to sever the welt.

13. A welt sewing machine for operating upon a shoe, said machine having stitch forming, work feeding and guiding devices for the shoe parts, a welt severing knife, a slide bar connected to the knife and formed with a cam projection, and electromagnetic means for actuating the slide bar, in combination with normally inoperative mechanism for advancing a severed end of the welt across the point of operation of the stitch-forming devices, comprising a toothed member normally out of engagement with the welt, means operated by the cam projection on the slide bar for forcing the toothed member against the welt when the knife is actuated to sever the welt, and a one-revolution clutch for actuating the toothed member to advance the welt.

14. A shoe machine for sewing a welt to a last supported shoe upper and a sole member, said machine having stitch forming, feeding and guiding devices for the shoe parts, and a welt severing knife mounted for movement toward and from the welt at a point in advance of the stitch forming devices, in combination with mechanism for actuating the knife comprising a feeler mounted for movement toward and from a shoe to engage and to be raised by the leading end of the welt sewn to the shoe, a carrier plate with which the feeler is connected for movement toward and from the shoe, means for locking the carrier plate against movement from the shoe before the feeler is engaged by the welt, and means for releasing the carrier plate from the locking means when the knife is actuated to sever the welt.

15. A shoe machine for sewing a welt to a last supported shoe upper and a sole member, said machine having stitch forming, feeding and guiding devices for the shoe parts, a welt severing knife mounted for movement toward and from the welt at a point in advance of the stitch forming devices, and mechanism for actuating the knife to sever the welt comprising an electromagnetic solenoid and an armature connected to the knife, in combination with mechanism for advancing the end of the welt remaining in the machine after being severed by the knife toward the stitch forming devices, including a toothed member and a cam projection connected to the said armature for forcing the toothed projection against the welt as it is being severed.

16. A shoe machine for sewing a welt to a last supported shoe upper and a sole member, said machine having stitch forming, feeding and guiding devices for the shoe parts, a welt severing knife mounted for movement toward and from the welt at a point in advance of the stitch forming devices, and mechanism for actuating the knife to sever the welt comprising an electromagnetic solenoid and an armature connected to the knife, in combination with mechanism for advancing the end of the welt remaining in the machine after being severed by the knife toward the stitch forming devices, including a toothed member and a cam projection connected to the said armature for forcing the toothed projection against the welt as it is being severed, and a latch lever for retaining the toothed member in engagement with the welt.

17. A shoe machine for sewing a welt to a last supported shoe upper and a sole member, said machine having stitch forming, feeding and guiding devices for the shoe parts, a welt severing knife mounted for movement toward and from the welt at a point in advance of the stitch forming devices, and mechanism for actuating the knife to sever the welt comprising an electromagnetic solenoid and an armature connected to the knife, in combination with mechanism for advancing the end of the welt remaining in the machine after being severed by the knife toward the stitch forming devices, including a toothed member and a cam projection connected to the said armature for forcing the toothed projection against the welt as it is being severed, a latch lever for retaining the toothed member in engagement with the welt, mechanism for actuating the toothed member while in engagement with the welt to advance the welt, and connections between the welt advancing mechanism and the latch lever for releasing the toothed member from engagement with the welt after the toothed member advances the welt.

18. A welt shoe sewing machine having stitch forming, feeding and guiding devices for the shoe parts, a welt severing knife mounted for movement toward and from the welt engaged by the guiding devices and mechanism for actuating the knife to sever the welt including an electromagnetic solenoid and an armature connected to the knife, in combination with means for energizing the solenoid including a power supply line, a main energizing switch for connecting the solenoid with the power supply line, a normally open safety switch interposed in a circuit with the energizing switch, means actuated by engagement with one of the shoe parts for operating the energizing switch, and a safety release lever operable under the control of the operator of the machine for closing the safety switch.

19. A welt shoe sewing machine having stitch forming, feeding and guiding devices for the shoe parts, a welt severing knife mounted for movement toward and from the welt engaged by the guiding devices and mechanism for actuating the knife to sever the welt including an electromagnetic solenoid and an armature connected to the knife, in combination with a power supply line, a main energizing switch for connecting the solenoid with the power supply line, a normally open safety switch interposed in a circuit with the energizing switch, a glow tube connected to the power supply line and a test switch in circuit with the glow tube, arranged when thrown to one position to extinguish the glow tube when the solenoid circuit is open and when thrown to another position to light the glow tube, the glow tube being lighted when the safety switch is closed.

20. A machine for sewing a welt to a last supported shoe upper and a sole member, said machine having stitch forming, feeding and guiding devices for the shoe parts, a welt severing knife mounted for movement toward and from the welt at a point in advance of the stitch forming devices, and electromagnetic means for actuating the knife, comprising a solenoid and an armature for the solenoid connected to the knife, a solenoid energizing switch and a feeler mounted for movement toward and from a shoe being operated upon, in combination with a carrier plate with which the feeler is connected, a lever rotatably mounted on the carrier plate and connected to the feeler and a safety release connected to the carrier plate for moving the knife toward the shoe and for simultaneously moving the lever toward the energizing switch to render the feeler capable of closing the energizing switch when it engages the welt on the shoe being operated upon.

21. A Goodyear welt shoe inseam sewing machine for attaching a welt to a last supported shoe upper and a sole member, said machine having stitch forming, feeding and guiding devices for the shoe parts, and a welt severing knife mounted for movement toward and from the welt at a point in advance of the stitch forming devices, in combination with means for actuating the knife comprising a feeler mounted for movement toward and from a bulging last supported portion of the shoe upper to engage the leading end of the welt already sewn to the shoe as that end approaches the stitch forming devices, and a plough-shaped finger acting to deflect the welt away from the last supported shoe upper toward the feeler as the welt approaches the feeler.

22. A Goodyear welt shoe inseam sewing machine for attaching a welt to a last supported shoe upper and a sole member, said machine having stitch forming, feeding and guiding devices for the shoe parts, and a welt severing knife mounted for movement toward and from the welt at a point in advance of the stitch forming devices, in combination with means for actuating the knife comprising a feeler mounted for movement toward and from a bulging last supported portion of the shoe upper to engage the leading end of the welt already sewn to the shoe as that end approaches the stitch forming devices, a plough-shaped finger acting to deflect the welt away from the last supported shoe upper as it approaches the feeler, and a yielding mounting for the welt deflecting finger for pressing the finger against the shoe upper during sewing operations.

23. A shoe machine for sewing a welt to a last supported shoe upper and a sole member, said machine having stitch forming, feeding and guiding devices for the shoe parts, a welt severing knife mounted for movement toward and from the welt at a point in advance of the stitch forming devices, and electromagnetic means for actuating the knife, in combination with a feeler mounted for movement toward and from the shoe being operated upon to engage the leading end of the welt already sewn to the shoe as that end approaches the stitch forming devices, an energizing switch positioned to be actuated by the feeler and connected in circuit with the electromagnetic actuating means, a safety switch in circuit with the electromagnetic means for preventing actuation of the knife until the safety switch is closed, means controlled by the operator of the machine for closing said safety switch, and means for rendering the feeler inoperative and for holding the energizing switch closed comprising an interponent arm formed to engage the energizing switch when the machine operates upon welt sewn to the sole member and upper along the forepart only of a shoe.

24. A machine for sewing a welt to a last supported shoe upper and a sole member, said machine having stitch forming and feeding devices for the shoe parts, a welt severing knife mounted for movement toward and from the welt at a point in advance of the stitch forming devices, a guiding device including a back rest and a yieldingly actuated slide for supporting the back rest and for pressing it against the shoe, in combination with mechanism for actuating the knife comprising a feeler mounted for movement toward and from a bulging last supported portion of the shoe upper to engage the leading end of the welt already sewn to the shoe as that end approaches the stitch forming devices, a finger acting to deflect the welt away from the shoe upper as it approaches the feeler and a yielding mounting for the welt deflecting finger secured to the back rest slide for pressing the deflecting finger against the shoe upper during sewing operations.

25. A Goodyear welt shoe inseam sewing machine for attaching a welt to a last-supported shoe upper and a sole member, said machine having stitch-forming feeding and guiding devices for the shoe parts including a welt surrounding guide movable to engage with its upper surface a shoe as it is tipped and turned to present the welt to the stitch-forming devices, a welt-severing knife mounted on the machine for movement in a fixed path toward and from the welt at a point in advance of the guide, in combination with means for actuating the knife to sever the welt comprising an electromagnetic solenoid, an armature for the solenoid connected directly with the knife for simultaneous movement in the same direction and at the same speed as the armature, a feeler located to engage the leading end of the welt already sewn on the shoe as that end approaches the stitch-forming devices after having sewn the welt about the periphery of the shoe, and a switch connected to the solenoid and controlled by the feeler as the sewing operation is continued without interruption to energize the solenoid and to cause the knife to form a clean-cut, close-fitting joint between the ends of the welt so sewn.

References Cited in the file of this patent

UNITED STATES PATENTS

| 1,774,498 | Ashworth et al. | Sept. 20, 1930 |
| 1,958,132 | Davis | May 8, 1934 |
| 2,022,754 | Ashworth | Dec. 3, 1935 |
| 2,041,945 | Morrill | May 26, 1936 |
| 2,151,438 | Pierce | Mar. 21, 1939 |
| 2,271,717 | Schwartz | Feb. 3, 1942 |
| 2,359,663 | Morrill | Oct. 3, 1944 |
| 2,562,810 | Muc | July 31, 1951 |
| 2,631,555 | Ashworth | Mar. 17, 1953 |